Figure 1:
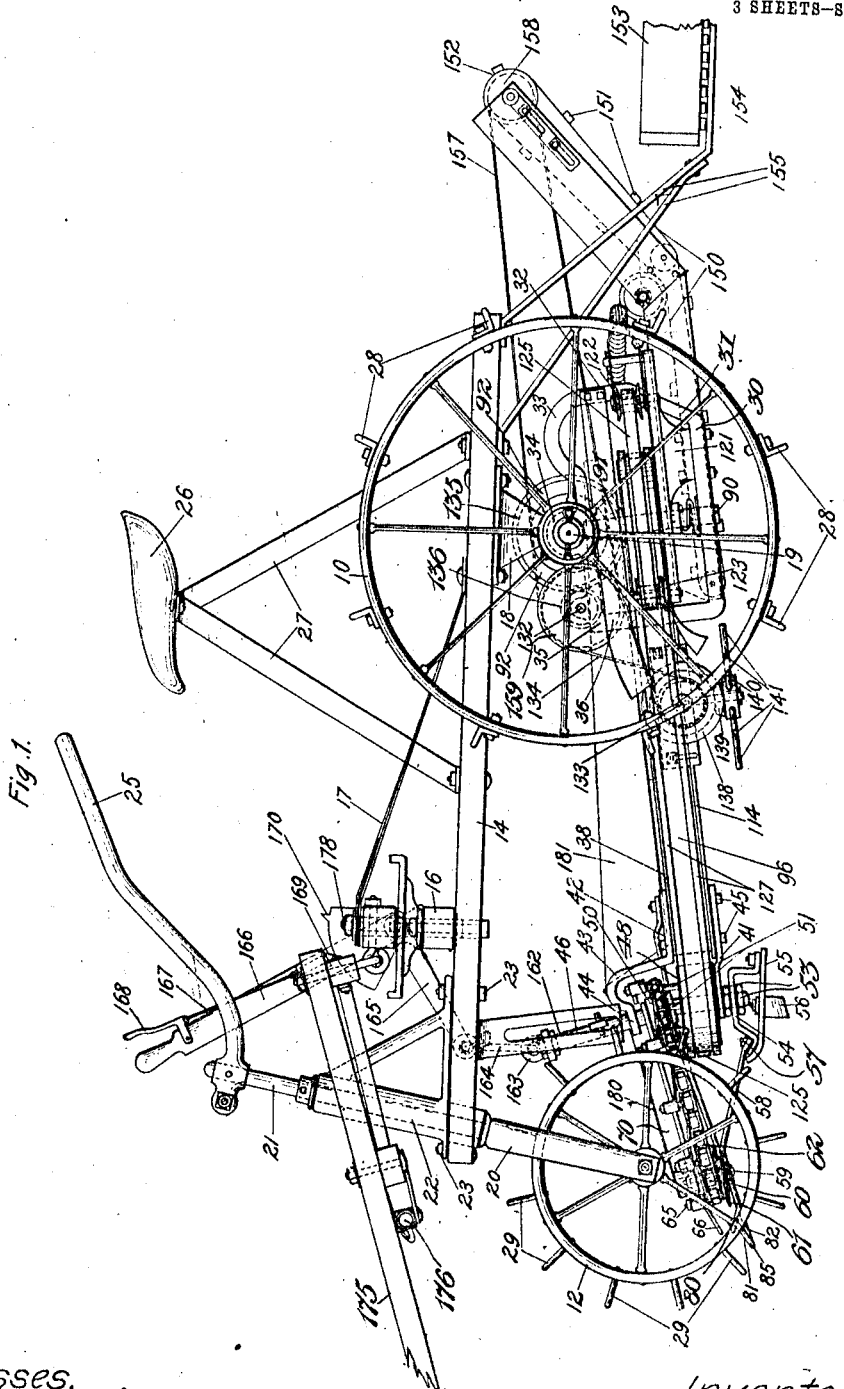

T. DE YOUNG, Jr.
ONION HARVESTER.
APPLICATION FILED JULY 27, 1908.

992,862.

Patented May 23, 1911.

3 SHEETS—SHEET 1.

Witnesses.
O. J. Christoffel
M. Rosenzweig

Inventor.
Teunis De Young Jr.
By Cheever + Cox
Attys.

T. DE YOUNG, Jr.
ONION HARVESTER.
APPLICATION FILED JULY 27, 1908.

992,862.

Patented May 23, 1911.
3 SHEETS—SHEET 2.

Witnesses
E. J. Christoffel
M. Rosenzweig

Inventor.
Teunis De Young Jr.
By Cheever & Cox
Attys.

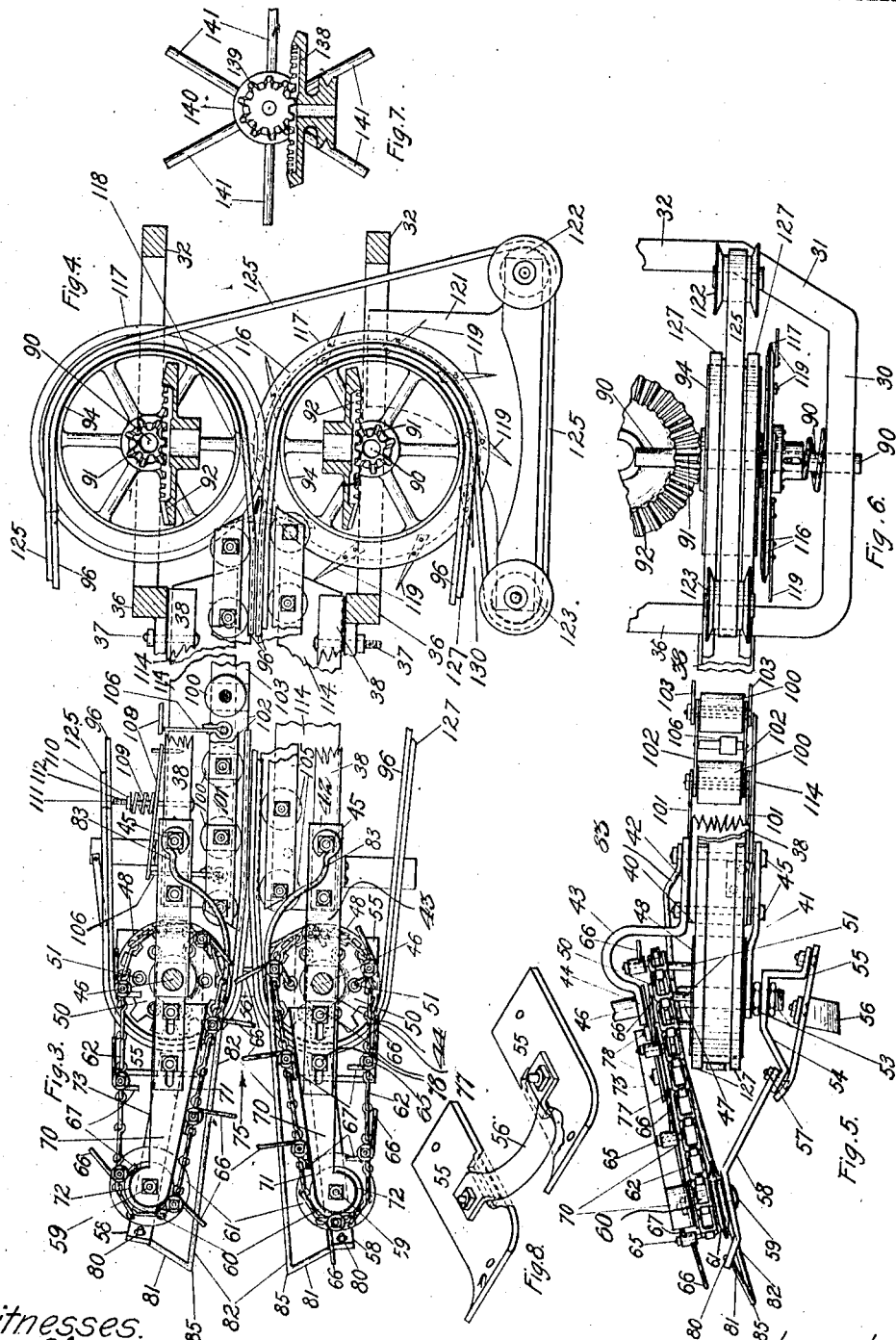

UNITED STATES PATENT OFFICE.

TEUNIS DE YOUNG, JR., OF SOUTH HOLLAND, ILLINOIS.

ONION-HARVESTER.

992,862.

Specification of Letters Patent.   Patented May 23, 1911.

Application filed July 27, 1908. Serial No. 445,602.

*To all whom it may concern:*

Be it known that I, TEUNIS DE YOUNG, Jr., a citizen of the United States, residing at South Holland, in the county of Cook and State of Illinois, have invented a certain new and useful Improvement in Onion-Harvesters, of which the following is a specification.

This invention relates to a machine for harvesting onions as they grow in the field either those raised from seed or from sets and for purpose of convenience, it will be described as an onion harvesting machine, but manifestly it may be used in harvesting other plants as for instance, radishes.

The object of the invention is to provide a machine which may be propelled by any suitable source of power through a field of growing onions, or other plants as stated, which machine will first lift up the onion tops which are above the earth, take hold of them, loosen the earth about the bulb of the onion, lift the entire onion plant out of the ground, knock off from the previously covered onion bulb the earth clinging thereto, transport the entire plant thence up through the machine to a point at which the onion bulb is severed from the top and deliver the bulb or useful product into a suitable receptacle at the same time delivering the tops or other waste product of the plant at a point adjacent to the machine where the same is not in the way.

The invention consists in mechanism for accomplishing the foregoing objects which can be easily and cheaply made and installed which is efficient in operation and is not readily liable to get out of order.

More in detail it consists in the following parts and combination of parts, viz., mechanism for straightening up the onion tops before the pulling and digging operation begins; mechanism for loosening the earth before and after said operation begins, mechanism for lifting the plant out of the earth and for then transporting it up through the machine to the cutting knives; mechanism operating intermediate of the last mechanism for knocking off loose portions of earth from the plant; mechanism for severing the bulb from the top of the plant; a conveyer for transporting the bulb to a measure or other receptacle and another conveyer mechanism for carrying the severed tops off at one side of the machine.

More in detail the invention consists in mechanism attached to the conveyer for accommodating therein different sized quantities of onions taken from different parts of the row.

The invention also consists in other details of construction which will be hereafter more fully described and claimed as the specification proceeds.

Figure 2:
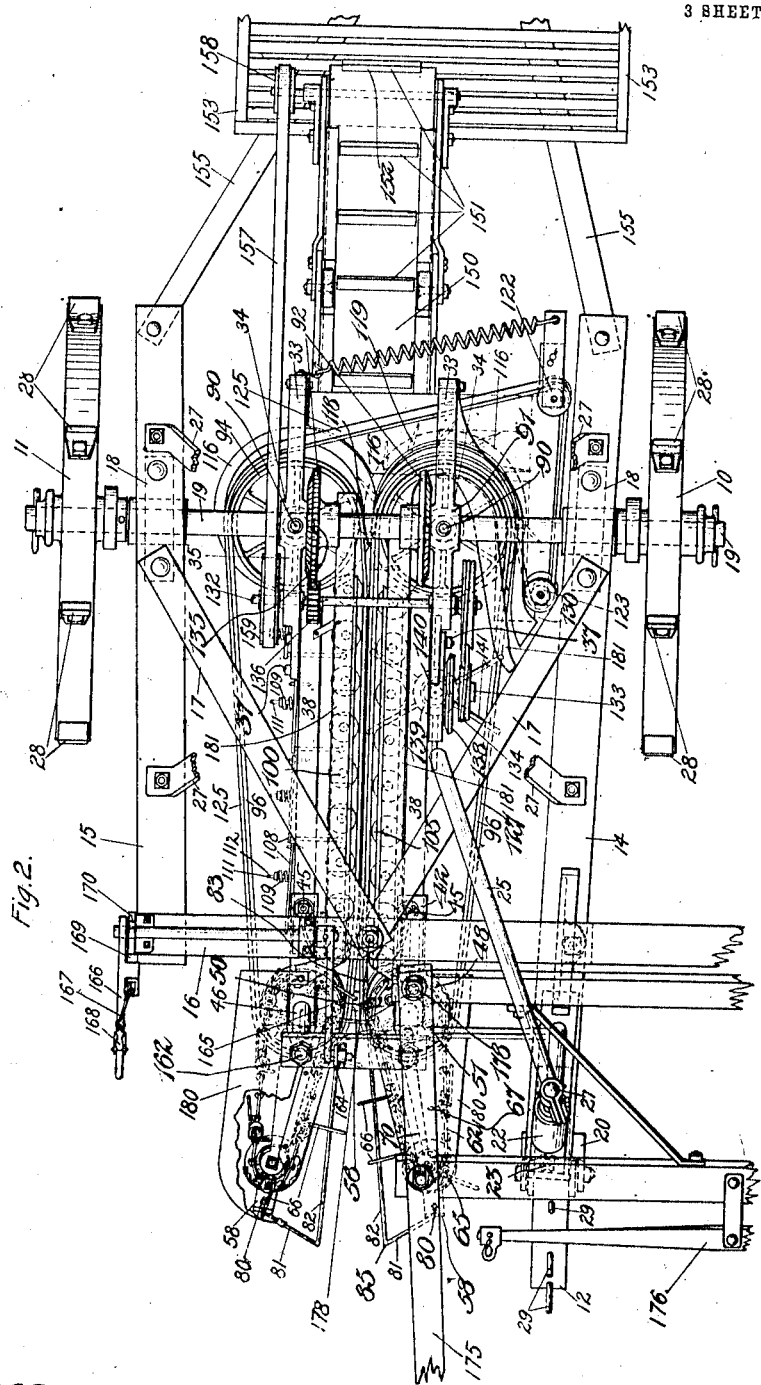

There are manifestly many forms of the present invention and simply for purposes of illustration the preferred form of the invention as heretofore constructed and used is illustrated in the drawings, in which:

Figure 1 shows a side view of the device ready to go into the field for work. Fig. 2 is a complete plan view of all the parts illustrated in Fig. 1. Fig. 3 is an enlarged plan view of the forward portion, and Fig. 4 a corresponding view, of the rear portion of the effective working mechanism of the machine. Fig. 5 is a side view of the parts illustrated in Fig. 3, and Fig. 6 is a corresponding view of Fig. 4. Fig. 7 is a detail view of mechanism designed to knock clods and other parts of earth from the onions as they pass up the conveyer leading to the knives and Fig. 8 is a detail view of a hoe for softening up the earth just as the onions are lifted out of the earth.

The real operating parts of the machine are in the particular mechanism here illustrated suspended from what might be termed a tricycle comprising two rear wheels 10 and 11 and a forward wheel 12 carrying a frame made up of the members 14, 15, 16 and 17. This frame is supported upon the wheels 10 and 11, by means of the castings 18, secured upon the main shaft 19, upon which at least one of the wheels 10 and 11 is rigidly connected so that as the machine is drawn through the field said shaft is powerfully rotated. This frame is supported upon the wheel 12 by means of the forked member 20 similar to that used in an ordinary bicycle or tricycle having an upwardly extending shaft 21 journaled in the bearing member 22 secured by the bolts 23 to the frame. At the upper end of this shaft 21 is a handle 25 adapted to be engaged by an operator seated upon the seat 26, supported by the members 27, for the purpose of steering the machine. Each of the wheels 10 and 11 is provided with projecting teeth 28 adapted to engage the earth and prevent slipping. The wheel 12 is also provided with similar anti-slipping teeth 29, The operating parts proper of the machine are mounted in a frame which will be, for purposes of description, referred to hereafter broadly as the "under frame" suspended from the mechanism heretofore described. The longer sides of this under frame consist essentially of two parallel members, each made up of the approximately rectangular member containing the parts 30, 31, 32, 33, 34, 35 and 36, secured by bolts 37 to the slightly inclined members 38. The parts 34 heretofore referred to are large enough so that they form bearings in which the shaft 19 is journaled; that is to say, each of the parallel members of the under frame is journaled upon this shaft or axle 19 by means of the member 34. These parallel members just described are held rigidly in parallel position by various mechanisms and parts attached thereto. On the under side of the forward end of each member 38 is an approximately horizontal plate 41, and on the opposite upper side is another irregular shaped member 42—43—44. These two members just described are secured to the end of the member 38 by means of the bolts 45 or other suitable means. Through the lower member 41 and through the portion 44 of the upper member just described which is at an angle to the plane of the plate 41 is a bolt 46 having a bend at the point 47, as best shown in Fig. 5, the bolts on the opposite sides of the frame being parallel to each other. Journaled upon the lower or approximately upright portion of each bolt 46 is a belt wheel 48 and journaled upon the angular portion of each bolt is a sprocket wheel 50 adapted to have power communicated to it from the belt wheel 48 by means of pins 51 rigidly secured to the belt wheel and loosely entering the sprocket wheel through suitable holes, as best seen in Fig. 3.

The lower end of each bolt 46 is secured by means of the nuts 53 to a frame member 54, carrying member 55. These members resemble the runners of a small sled, adapted to travel along the ground. These two members 55 are spaced apart by the hoe or cutting member 56 adapted to soften the earth just before the onions are lifted from the earth.

Secured to the forward end of the sled member 54—55 by means of the bolts 57 are two braces 58 each carrying upon its forward end a pin 59 upon which is journaled a small pulley 60 having a flange 61 on which a sprocket chain 62 passing over this pulley 60 and the adjacent sprocket wheel 50, heretofore described, passes. Pivotally mounted upon suitable pins 65 upon each sprocket chain 62 are outwardly extending fingers, preferably made of wire 66, having extending from their pivotal portions short arms 67 adapted to travel upon and engage the cam 70 having the straight face 71, the semi-circular face 72 and the straight face 73, as best seen in Fig. 3, the whole so arranged that the teeth or projecting members 66 will stand outwardly from the chain when they are adjacent to the center of the machine, i. e. when they are working upon the plants to be harvested, and they will at least be free to, if they do not actually lie in close contact with the chain, as shown in Fig. 3, when they reach the outside of the machine, and might, therefore, engage with plants in other rows than the one being harvested. This cam just described is secured upon the bolt 59 heretofore described, and to the bolt 46 by means of the plate 77 and the bolts 78. It will also be noticed that as the chains 62 incline upward from the ground toward the conveyer proper, and as the center faces of the chains or those toward each other converge in the direction of arrow 75 the fingers 66 have both a gathering together and straightening action upon tops of the plants engaged by them as hereafter described.

Secured to the forward end of each brace 58 at 80 is a wire member 81—82 having its opposite end 83 secured to the frame member 38 by means of the bolt 45. In this wire member is a sharp point 85, adapted to engage and hoe the earth.

Journaled in each portion 30 and 34 of each side member of the under frame is a vertical shaft 90 carrying near its upper portion a beveled gear wheel 91 meshing with a larger gear wheel 92 mounted upon the main driving shaft 19 heretofore described, so that the rotation of this main shaft 19 as the machine is drawn through the field communicates its powerful rotation through the gears 92 and 91 to these vertical shafts 90. Rigidly secured to each shaft 90 is a horizontal belt wheel or pulley 94. Over each of these pulleys 94 and the adjacent horizontal pulley 48 heretofore described, is an endless belt 96 so that the power in each pulley 94, is communicated through the adjacent pulley 48 to the adjacent sprocket chain 62 heretofore described.

The two endless belts 96 are held in contact with each other by mechanism which consists in a plurality of rollers 100, on one side of the underframe, mounted in pairs upon links 101, 102, 103, etc., so that each pair of rollers is flexible with reference to the next pair of rollers, the kind of flexibility resembling somewhat that of an ordinary link chain set on edge and a corresponding set of stationary rollers 105 mounted adjacent to the opposite belt. As often as need be the flexible links are supported upon horizontal rods 106, best seen in Fig. 3, which are slidably movable horizontally through the frame member 38 and are spring pressed toward the center of the machine by the lever members 108 and the springs 109, said action being adjustable by means of the nut 110 threaded at 111 upon the bolt 112. These flexible link mounted rollers 100 are as shown and stated located along the center line of the machine and bear against one belt heretofore described, and thus under the action of the springs 109 hold it in close contact with the opposite belt carried by the rollers 105. This spring construction may be applied to the rollers 105 without departing from the spirit of this invention. These linked rollers 100 and the rollers 105 are held in the same horizontal plane by means of plates 114 secured by any suitable means upon the under sides of the members 38. In other words these plates 114 resemble shelves extending from the under sides of these members 38 on which the rollers are supported, as best seen in Fig. 3, and on which the flexible rollers move horizontally laterally of the machine. There is sufficient distance between the plates on opposite sides of the center line of the machine so that the onions which are to be worked upon by the machine may be carried by the belts 96 with or without the belt 125 to be hereafter described through the machine between these plates in the direction of the arrow 75.

Upon the under side of each pulley 94 heretofore described is secured a sharpened circular cutting knife 116 having the sharpened edge 117 the two shearing together at the point 118 in the center line of the machine. One of these cutting wheels 116 has projecting from it driving teeth adapted to positively engage onions or other product to be worked upon, delivered by the belts 96 at the shearing point 118.

Rigidly secured at some suitable point upon the under frame is a casting 121 carrying two pulleys 122 and 123 over which passes a belt 125 which, as shown, passes around one belt 96 heretofore described carried by one set of pulleys 94—48 and thence between the two belts 96, being supported by flanges 127 upon one belt 96. The effect of this latter construction is to give a firm grip by the contacting belts at the center of the machine for the purpose of conveying the onions through the machine, as well as to support belt 125.

Sufficient mechanism has now been described to attempt a statement of the operation of the mechanism heretofore described. As the machine is propelled along a row of onions located on the center line of the machine, the machine moving in a direction contrary to the arrow 75 or to the left of Figs. 1 and 2, the points 85 travel close to the ground and the wires 82 lift up the onion tops which are lying upon the ground adjacent to the product which is to be harvested. As these wires lift up the tops, the moving members 66 carried by the sprocket chains take hold of them and lift them higher and at the same time pack them together, so that as the machine advances they slip in between and are grasped by the advancing forward ends of the inter pressed belts 96—125. As this takes place, the hoe 56 engages the earth, digs it, and therefore helps to release the onions from the ground. The entire operating mechanism being when in working position located on an incline, as shown in Fig. 1, the conveying belts 96—125 gradually pull the onions out of the ground, and carry them to the shear point 118 where the knives 116 shear the onions from the tops and the onions proper drop down from the knives either into a conveyer, which will be hereafter described, or onto the ground, while the tops are carried between the belt 125 and the lower belt 96 of Figs. 2, 3 and 4, until they reach the point 130 approximately adjacent to the pulley 123, at which the belt 125 begins to move away from the adjacent belt 96, and the onion tops are released and allowed to drop upon the ground at the side of the machine.

Journaled upon the under frame at any suitable points are two shafts 132 and 133 connected by a belt 134. The shaft 132 is power driven by means of gears 135 and 136 from the main shaft 19. The lower shaft 133 communicates power through bevel gearing 138—139, to a wheel 140 having projecting arms 141 located in the path of the onions traveling through the machine in the manner described. This wheel 140 is so located that the arms 141 strike the onions being transported by the belts 96—125 and knock off from them clods of earth hanging thereto prior to the time the onions proper are severed from the tops in the manner described. The mechanism operating the wheel is so constructed that the arms on the wheel, when in operative position travel in a direction opposite to the path of travel of the plant in the conveyer thereby increasing the force of the blow given the bulb and the earth clinging thereto.

Immediately below the cutting knives heretofore described is a conveyer belt 150 of the ordinary type and construction, having upon it blocks 151, adapted, as the belt travels, to convey onions severed by the cutting knives up to the position 152, from which they fall into suitable measures or other receptacles 153, carried upon the platform 154 mounted upon the bracing members 155 at the rear of the machine. This conveyer 150 is driven by a belt 157 passing over the pulley 158 and a pulley 159 upon the shaft 132 heretofore described.

As heretofore described this entire operating mechanism is pivoted in the members 34 on the main shaft 19, from which it follows that the forward end of the operating mechanism may for purposes of passing from the end of one row of onions to the beginning of another or for transportation from place to place be lifted out of the earth when suitable mechanism is provided. This mechanism consists of an extension 162 of one of the bolts 46 heretofore described, carrying at its upper end a loop 163 to which is connected a link 164 connected in turn to a bell crank lever mechanism 165—166, adapted to be manipulated by the operator upon the seat 26. This lever mechanism contains a locking rod 167 and handle 168 adapted to manipulate a locking tooth 169 which engages a stationary tooth 170 to lock the parts in elevated position in exactly the same manner as hay rakes and other similar farm mechanism are locked in elevated position.

The machine is propelled through the field preferably by means of a horse attached to thills 175 and whiffle-tree 176, said thills being attached at approximately the center of the machine 178, by mechanism well known in the art for use upon machines drawn along a row of plants in a field, which mechanism forms no part of my invention, and is not, therefore, described in detail.

In order to prevent trouble with dirt the operating parts are in practice inclosed as far as possible in metallic cases 180 and 181.

Having thus described my invention, what I claim as new, and desire to secure by Letters Patent, is:

1. In mechanism of the class described, the combination with a cutting mechanism and a mechanism adapted to take hold of the plants and carry them to the cutting mechanism; a mechanism in front of said conveying mechanism adapted to pass along the sides of the plant tops as they lie upon the ground and gather them toward the center of the row and another mechanism for packing together the portions of the tops not previously engaged by the last mentioned mechanism before the conveying mechanism takes hold.

2. In mechanism of the class described, the combination with a cutting mechanism and a mechanism adapted to take hold of the plants and carry them to the cutting mechanism; guiding members such as wires 81—82 adapted to lift from the ground portions of the tops of the plants extending to the side of the row and a movable packing mechanism having packing fingers extending transversely of the row and moving along it adapted to gather up the remaining portion of the tops of the plants preparatory to their being grasped by the conveying mechanism.

3. In mechanism of the class described, the combination with a cutting mechanism and a mechanism adapted to take hold of the plants and carry them to the cutting mechanism; a mechanism for gathering together tops of the plants preparatory to being grasped by the conveying mechanism consisting in two endless chains, their supporting pulleys and mechanism for rotating said pulleys to move said claims, mounted with one pulley for each chain adjacent to the grasping portion of the conveyer and the other pulley for each chain adjacent to the ground, in combination with projecting fingers upon said chains as described, for the purposes set forth.

4. In mechanism of the class described, in plant top gathering and packing mechanism comprising two endless chains, suitably mounted pulleys therefor, mechanism for rotating said pulleys, fingers pivotally mounted upon said chains and cams for causing said fingers to project outwardly from the chains when they are in the space between the two chains and adapted to allow said fingers to lie flat against the chain during other portions of their travel for the purposes described.

In witness whereof, I have hereunto subscribed my name in the presence of two witnesses.

TEUNIS DE YOUNG, Jr.

Witnesses:
DWIGHT B. CHEEVER,
C. J. CHRISTOFFEL.